Figure 1:
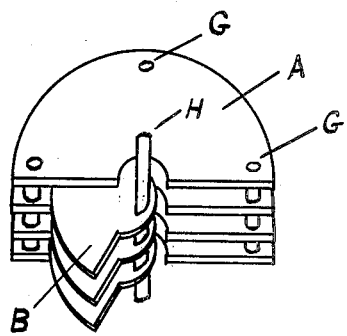

April 13, 1937.   J. J. AURYNGER   2,076,874
ELECTRICAL CONDENSER
Filed Aug. 31, 1933

John J. Aurynger
INVENTOR.

Patented Apr. 13, 1937

2,076,874

UNITED STATES PATENT OFFICE 2,076,874

ELECTRICAL CONDENSER

John J. Aurynger, Takoma Park, Md.

Application August 31, 1933, Serial No. 687,681

2 Claims. (Cl. 175—41.5)

This invention is an improvement in embossed cupules integral with the condenser plate as set forth in my former patent for embossed cupules, Patent No. 1,697,258, dated, January 1, 1929. This invention further provides a screw thread on the studs for holding the condenser plates with the proper spacing between the plates and is an improvement over the old style stud with a smooth shank which bolts the plates together.

The object of this invention is to hang condenser elements on conducting rods provided with screw threads at predetermined intervals and also better processes for the production of the horn-like devices obtained from the embossed cupule. The conductivity of a condenser with these improved joints is not less than a soldered or welded joint, also the mechanical structure can be made cheaper than a soldered condenser.

This invention is related to spacing condenser plates apart by means of projections on condenser plates integral with the condenser plate. It has been found that an embossed section of the condenser plate is very inaccurate as a spacing device. This invention tells how to modify the embossed section so that it acts as an accurate spacing device. This invention is also related to case-hardened screws holding several plates together but differs from the commercial article in that in this invention the plates are situated at spaced intervals and the screw thread improves the electrical conductivity.

It has been found that the thickness of the embossed sections and therefore the height of the embossing differ on the same plate. The metal is cold drawn through the dies and stretches unevenly.

This inaccuracy may be overcome by embossing the plate to a greater depth than is necessary for a spacing device and stretching the metal to an amount greater than the spacing distance. The bottom of the embossed section is removed. Then the perpendicular sides are bent outward by compression forming an external collar or ring, the amount of compression not to exceed that necessary to give the embossing the correct spacing distance for holding the plates apart.

Previous to this invention it was the custom in this type of condenser to insert a bolt through the embossings thus formed on several super-imposed plates and tightening nuts on the ends of the bolts. The electrical conductivity in this type depends upon the contact surfaces between two adjacent plates, and is not as good as a soldered joint. A joint between two adjacent plates can be made equal or better to a soldered joint by inserting a case-hardened screw through the central orifice of the embossing in which the thread of the screw cuts its own path in the condenser plates.

When there are only a few plates and the spacing between the plates is not great, studs having a continuous screw thread the entire length of the stud may be used.

Where the spacing between the condenser plates is too great to permit contact between adjacent plates a separate screw unit may be provided for each condenser plate. The plates are properly spaced before the screw is inserted. The screw rigidly holds the plates at the proper spacing distance. When referring to a screw thread a spiral thread is generally understood. This invention also includes the use of vertical threads on the stud.

Referring to the drawing by figures. Fig. 1 represents a very common use of spacing devices in induction apparatus, namely, between condenser plates. The spacing device is of equal importance on both the rotor and the stator so that the plates of the rotor will interleave accurately with the plates of the stator.

Figure 2:
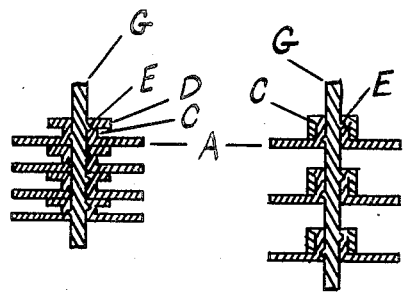
Figure 3:
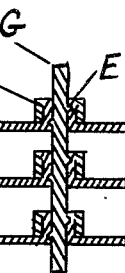

Figures 2 and 3 represent cross-section views of Fig. 1 at a point of joining the condenser plates through a stud. In Fig. 2 the spacing of the plates is not very great and the plates touch. In Fig. 3 the spacing between plates is too great for the plates to touch. The external flange permits a tight fit between the orifice and the screw.

Figure 4:
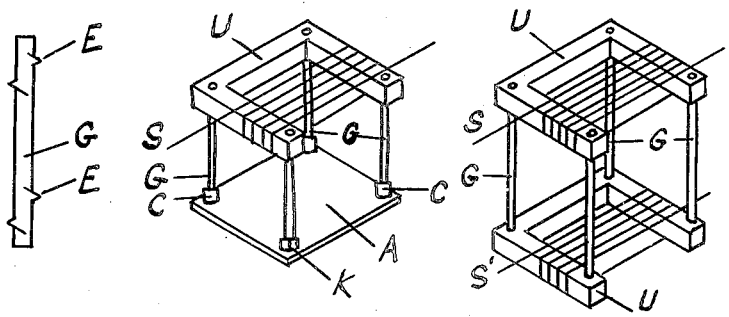

Fig. 4 shows two screws in one. Two screw units are placed at spaced intervals on a single shaft. Although joined by a single shaft there is a separate screw for each condenser plate.

Figure 5:
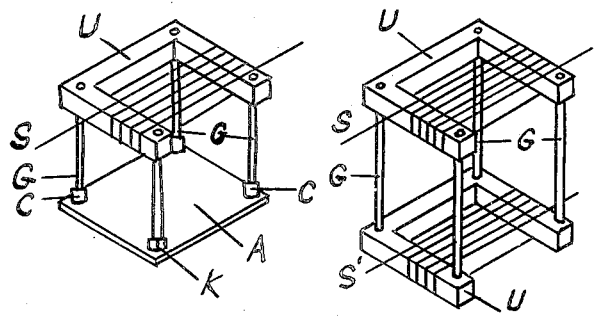

Fig. 5 shows how this invention holds in inductive relation a coil and a plate element. One of the plate elements as in Fig. 1 may be modified by the use of a coil in place of a plate.

Figure 6:
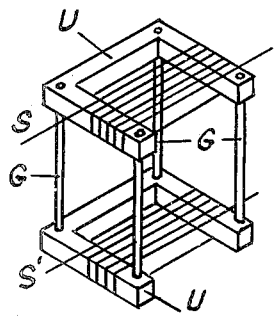

Fig. 6 is another modification of Fig. 1. Two coils on flat frames are accurately spaced apart. The invention is not limited to two coils but may consist of an element composed of several coils accurately spaced with respect to one another. The shafts in addition to acting as spacing devices give rigidity to the structure but do not carry electricity unless an end of each coil is joined to one of the shafts.

This improvement consists of forming a cupule on a cupule. The connecting studs are not joined directly to the plate. The cupule is intermediate between the plates and the connecting studs.

Referring to the drawing by letter, in Fig. 1 "A" represents the stator plates of a condenser in inductive relation to the rotor plates "B". "G" represents case-hardened screws on shafts used for studs to hold the stator plates together by passing the screws through the central orifices of the embossed sections as "C". "H" represents a shaft having a screw thread for holding the rotor plates "B" in spaced relation to each other and the stator plates "A".

In the cross-section view of Fig. 1, shown in Fig. 2, "A" shows a section of the stator plates. The plates have embossings "C" integral with the plates. In addition to having the internal flange or bottom removed, each embossing is afterwards provided with an external flange by compressing the sides of the cupule to a height less than the sides of the embossing and equal to the distance required for spacing between plates. The external flange "D" is parallel with plates "A". "G" represents a shaft passing through the central orifice of the embossings having a case-hardened thread "E" for cutting its way through each plate. This gives a good mechanical joint having high electrical conductivity.

Fig. 3 is also a cross-section view of a section of the stator plates having a spacing distance between the plates too great to permit contact between adjacent plates. The external collar to the embossing is further modified by bending down double and parallel to the side, thus it forms a reinforcement to the sides of the embossing. Each plate is held in place vertically by a single shaft. The means for holding the plates in spaced relation may be a single screw thread running the whole length of the shaft, or it may be a separate screw unit for each condenser plate with no connection between separate screw units. Each screw thread cuts its way through its own condenser plate.

Fig. 4 represents a new type of case-hardened screw particularly adapted to high conductivity in electrical condensers. No bolts are necessary and there are no nuts on the ends of the shaft since the joint between the shaft and each condenser plate forms a unit by itself. "G" represents the shaft with case-hardened screw threads "E". These screw threads may be slight projections of no considerable length so that a slot in the cupule will allow free passage through a set of plates arranged in tablet form. Then by turning the shaft slightly separate screw threads cut their way simultaneously into each of the condenser plates. In place of the slot in a circular cupule an irregular shape of cupule as set forth in Patent No. 1,697,258 may be used. When the screw thread runs vertically with the shaft without a twist or with only a slight twist, a circular cupule may be used without having a slot cut in the side. One screw thread locks all the condenser plates in position. The annular screw threads can not be used on the same shaft with the vertical screw threads. The annular screw threads may be so short that they no longer resemble a spiral.

The slotted cupule is only a modification of the circular cupule. The stud may have a screw thread running the entire length of the stud. The stud thread is forced obliquely through the cupule giving an increased friction surface of contact between the stud and the plate.

In Fig. 5 "U" represents an insulating frame as of bakelite on which is wound a flat spiral coil element "S" having inductive relation with the plate element "A" when properly spaced apart. This figure shows the mechanical connection between the plate and the coil. By using longer shafts more units, either plates or coils may be added. The electrical behavior of a device consisting of a plate and a coil in inductive relation to each other is different from a condenser consisting of a plurality of coils and plates used as elements of the condenser because the increased resistance of the additional units modifies the condenser charge. "C" represents the embossing on the plate "A" with a slot "K" to allow free passage of the shaft "G". By turning the shaft slightly the screw threads on "G" engage the condenser plate. The collar made by compressing the sides of the cupule make it possible to cut slots in the sides of the cupule without decreasing the strength of the cupule for spacing devices.

In Fig. 6 two coils of insulated wire "S" and "S'" are wound on insulating frames "U" and are spaced apart by shafts "G". The shafts have screw threads near the terminals for passing into the frames "U". The use of two or more coils as a stator of a condenser thus arranged has been made the subject of another patent. The shafts "G" may be insulated from the circuit or the terminals of the coils may be joined to a shaft to make connections.

Having described my invention, I claim:

1. A condenser assembly comprising a stator frame and a rotor frame interleaving with said stator, having plate elements superimposed one above the other and in alignment, having multilayer walls on circular, cupular appurtenances integral with said plates centrally perforated; and transverse frame elements provided with case-hardened screw threads passing through central orifices of said cupular members, to cause said threads to penetrate obliquely the inner walls of said cupular bodies, to lock said condenser plates in predetermined spaced relation to each other, said transverse frame elements to form a multiple, continuous, electrical conductor joined with said spaced plates.

2. A condenser assembly comprising a stator frame and a rotor frame interleaving with said stator, having plate elements superimposed one above the other and in alignment, having multilayer walls on slotted circular cupular appurtenances integral with said plates centrally perforated; and transverse frame elements provided with sectional case-hardened screw threads passing through central orifices of said slotted cupular members, said sectional threads penetrating obliquely the inner walls of said cupular bodies, to lock said condenser plates in predetermined spaced relation to each other, said transverse frame elements to form a multiple, continuous, electrical conductor joined with said spaced plates.

JOHN J. AURYNGER.